(12) United States Patent
Venkatraman et al.

(10) Patent No.: US 9,330,471 B2
(45) Date of Patent: May 3, 2016

(54) CAMERA AIDED MOTION DIRECTION AND SPEED ESTIMATION

(71) Applicant: QUALCOMM Incorporated, San Diego, CA (US)

(72) Inventors: Subramaniam Venkatraman, Fremont, CA (US); Victor Kulik, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 13/767,755

(22) Filed: Feb. 14, 2013

(65) Prior Publication Data

US 2014/0226864 A1    Aug. 14, 2014

(51) Int. Cl.
*G06T 7/20* (2006.01)
*G01C 21/20* (2006.01)
*G01C 21/12* (2006.01)

(52) U.S. Cl.
CPC . *G06T 7/20* (2013.01); *G01C 21/12* (2013.01); *G01C 21/20* (2013.01)

(58) Field of Classification Search
CPC .......................................................... G06T 7/20
USPC .......................................................... 382/107
See application file for complete search history.

(56) References Cited

U.S. PATENT DOCUMENTS

| | | | |
|---|---|---|---|
| 7,774,113 B2 | 8/2010 | Oyaide | |
| 8,194,926 B1 | 6/2012 | Keysers et al. | |
| 2004/0252230 A1* | 12/2004 | Winder | 348/402.1 |
| 2005/0113995 A1* | 5/2005 | Oyaide | 701/36 |
| 2005/0234679 A1 | 10/2005 | Karlsson | |
| 2009/0024353 A1 | 1/2009 | Lee et al. | |
| 2009/0240464 A1* | 9/2009 | Dietz et al. | 702/143 |
| 2010/0053324 A1* | 3/2010 | Kim et al. | 348/142 |
| 2010/0066751 A1* | 3/2010 | Ryu et al. | 345/581 |
| 2011/0103644 A1* | 5/2011 | Garten | 382/103 |
| 2011/0149094 A1* | 6/2011 | Chen | H04N 5/23248 348/208.3 |
| 2011/0158473 A1 | 6/2011 | Sun et al. | |
| 2012/0136573 A1 | 5/2012 | Janardhanan et al. | |
| 2012/0176492 A1 | 7/2012 | Garin | |
| 2012/0245839 A1 | 9/2012 | Syed et al. | |
| 2012/0296603 A1* | 11/2012 | Kulik et al. | 702/160 |
| 2012/0299960 A1* | 11/2012 | Soderstrom | 345/629 |
| 2013/0006953 A1* | 1/2013 | Epshtein et al. | 707/706 |
| 2013/0222589 A1* | 8/2013 | Lalonde et al. | 348/148 |

FOREIGN PATENT DOCUMENTS

JP         4273074 B2    6/2009

OTHER PUBLICATIONS

International Search Report and Written Opinion—PCT/US2014/011687—ISA/EPO—Apr. 14, 2014.

* cited by examiner

*Primary Examiner* — Stephen R Koziol
*Assistant Examiner* — Delomia L Gilliard
(74) *Attorney, Agent, or Firm* — Silicon Valley Patent Group LLP

(57) ABSTRACT

Methods and devices for camera aided motion direction and speed estimation are disclosed. The method of determining position characteristics of a mobile device comprises capturing a plurality of images that represent views from the mobile device, adjusting perspectives of the plurality of images based at least in part on an orientation of the mobile device, determining a misalignment angle with respect to a direction of motion of the mobile device using the plurality of images, and storing the misalignment angle and the direction of motion in a storage device.

35 Claims, 9 Drawing Sheets

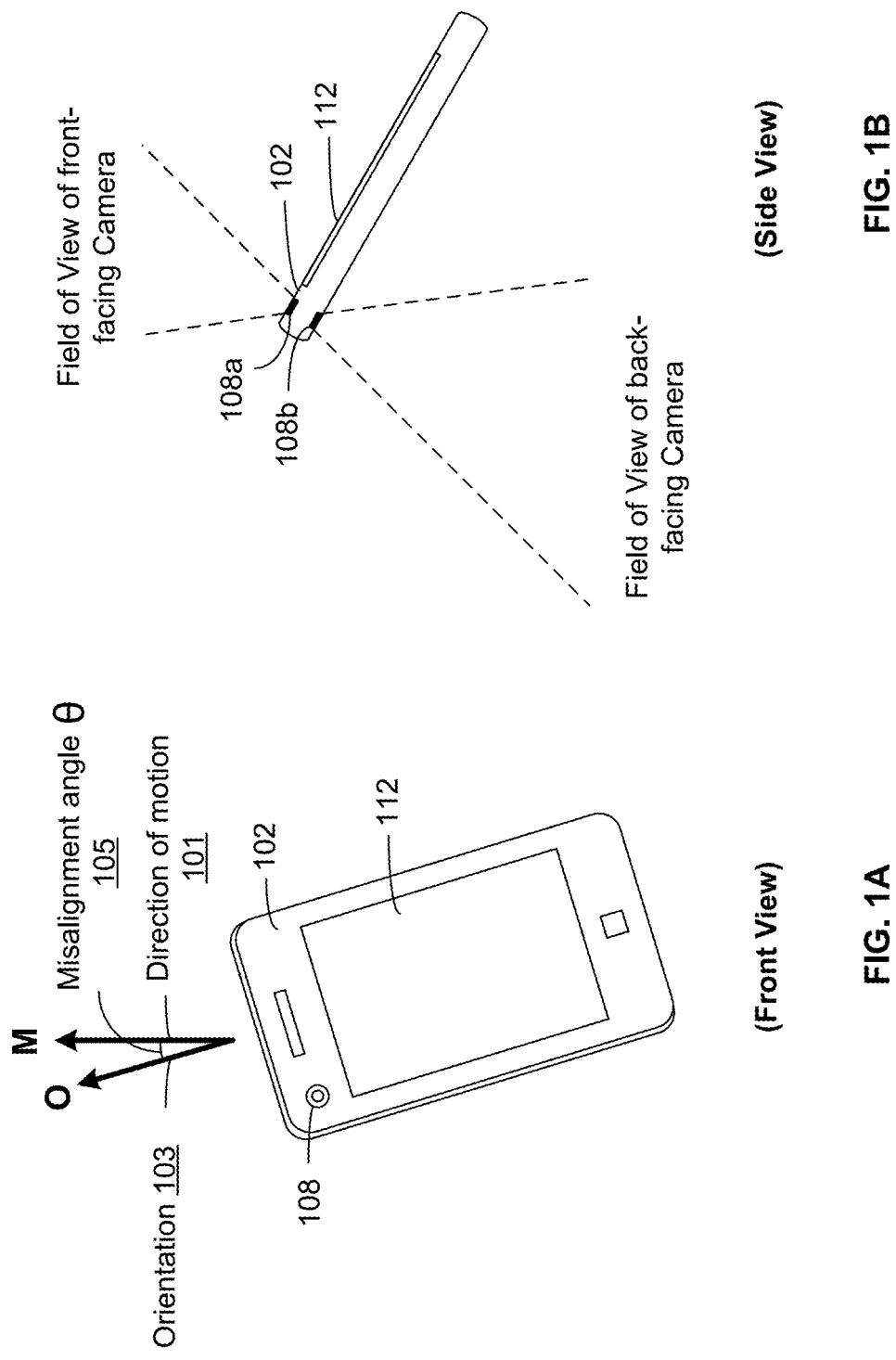

CAMERA AIDED MOTION DIRECTION AND SPEED ESTIMATION

FIELD

The present disclosure relates to the field of wireless communications. In particular, the present disclosure relates to determining position characteristics of a mobile device.

BACKGROUND

Various mobile device applications, such as navigation aids, business directories, local news and weather services, or the like, leverage knowledge of the position of the device. In various cases, the position of a mobile device is identified via motion tracking with respect to the device. For example, in the case of sensor-aided pedestrian navigation applications, motion direction is determined using the orientation of the device sensors in relation to the direction of forward motion. The angle between the orientation of the mobile device and the forward motion direction is referred to as the alignment angle or misalignment angle. For mobile applications that assist users while they travel on foot, the orientation of the mobile device may change frequently, which may in turn change the misalignment angle of the mobile device frequently, and may adversely affect the user experience of such mobile applications.

Therefore, there is a need for methods and systems that can address the above issues of conventional solutions.

SUMMARY

The present disclosure relates to methods and apparatuses for determining position characteristics of a mobile device. According to embodiments of the present disclosure, a method of determining position characteristics of a mobile device comprises capturing a plurality of images that represent views from the mobile device, adjusting perspectives of the plurality of images based at least in part on an orientation of the mobile device, determining a misalignment angle with respect to a direction of motion of the mobile device using the plurality of images, and storing the misalignment angle and the direction of motion in a storage device. The method further comprises applying the misalignment angle and a confidence of the misalignment angle to navigate a user of the mobile device.

The method of adjusting perspectives of the plurality of images comprises at least one of: adjusting perspectives of the plurality of images based on the orientation of the mobile device calculated using data collected from one or more sensors; compensating for perspectives of the plurality of images using an area near centers of the plurality of images; and compensating for perspectives of the plurality of images based at least in part on a weighted average of locations of features in the plurality of images.

The method of determining the misalignment angle comprises tracking features from the plurality of images, estimating direction of motion of the mobile device, estimating the orientation of the mobile device using sensor data, and determining the misalignment angle based at least in part on the direction of motion and the orientation of the mobile device. The method of tracking features from the plurality of images comprises rejecting outliers in features of the plurality of images to eliminate at least one moving object in the plurality of images.

The method further comprises at least one of: determining a confidence of the misalignment angle with respect to the direction of motion of the mobile device using information provided by a gyroscope of the mobile device, determining the confidence of the misalignment angle with respect to the direction of motion of the mobile device using information provided by a magnetometer of the mobile device, and determining the confidence of the misalignment angle with respect to the direction of motion of the mobile device using features of the plurality of images.

The method further comprises determining a speed estimation of the mobile device, determining a confidence of the speed estimation of the mobile device, and applying the speed estimation and the confidence of the speed estimation to navigate a user of the mobile device. The method of determining a speed estimate comprises extracting features from the plurality of images, computing an average displacement of the mobile device using the features from the plurality of images, and computing the speed estimate based at least in part on the average displacement of the mobile device. The method of computing the speed estimate comprises comparing the features from the plurality of images, determining a separation of pixels between two consecutive images in the plurality of images, determining a time interval between the two consecutive images, and calculating the speed estimate of the mobile device in accordance with the separation of pixels and the time interval between the two consecutive images. The method further comprises calibrating a height of the mobile device according to at least one of GPS location information and WIFI location information of the mobile device.

In yet another embodiment, an apparatus comprises a control unit including processing logic, where the processing logic comprises logic configured to capture a plurality of images that represent views from the mobile device, logic configured to adjust perspectives of the plurality of images based at least in part on an orientation of the mobile device, logic configured to determine a misalignment angle with respect to a direction of motion of the mobile device using the plurality of images, and logic configured to store the misalignment angle and the direction of motion in a storage device.

In yet another embodiment, a computer program product comprising non-transitory medium storing instructions for execution by one or more computer systems, the instructions comprise instructions for capturing a plurality of images that represent views from the mobile device, instructions for adjusting perspectives of the plurality of images based at least in part on an orientation of the mobile device, instructions for determining a misalignment angle with respect to a direction of motion of the mobile device using the plurality of images, and instructions for storing the misalignment angle and the direction of motion in a storage device.

In yet another embodiment, a system comprises means for capturing a plurality of images that represent views from the mobile device, means for adjusting perspectives of the plurality of images based at least in part on an orientation of the mobile device, means for determining a misalignment angle with respect to a direction of motion of the mobile device using the plurality of images, and means for storing the misalignment angle and the direction of motion in a storage device.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

FIG. 1A illustrates an example of misalignment angle with respect to direction of motion of a mobile device according to some aspects of the present disclosure. FIG. 1B illustrates a side view of the mobile device 102 of FIG. 1A.

Like numbers are used throughout the figures.

DESCRIPTION OF EMBODIMENTS

Figure 2C:
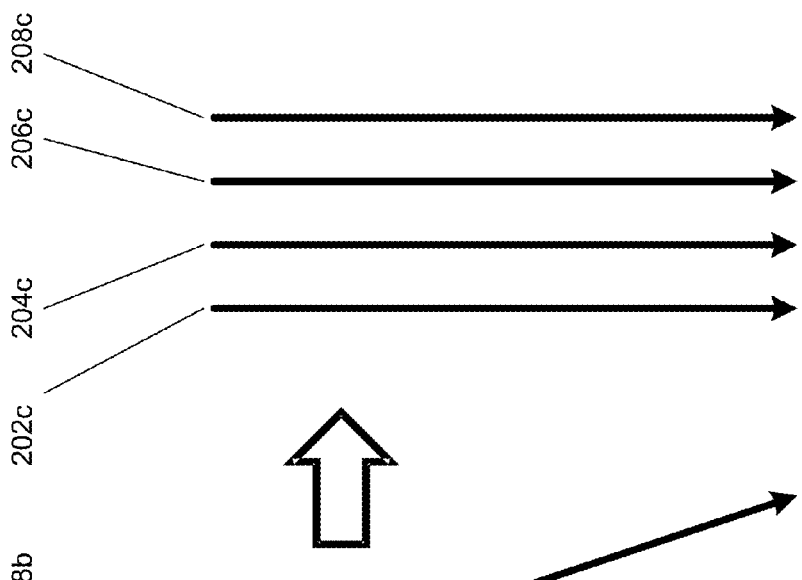
FIG. 2A-2C illustrate a method of performing perspective compensation for camera pitch and asymmetric distribution of features according to some aspects of the present disclosure.

Embodiments of methods and apparatuses for client-server based dynamic search are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

FIG. 1A illustrates an example of misalignment angle with respect to direction of motion of a mobile device according to some aspects of the present disclosure. As shown in FIG. 1A, in some use cases, direction of motion 101 of a mobile device 102 may be different from the mobile device orientation 103. The misalignment angle 105 is the angle between the mobile device orientation 103 and the direction of motion 101. Note that in some publications, the misalignment angle 105 may also be referred to as an alignment angle. The ability to predict the misalignment angle 105 can be useful for pedestrian navigation applications. The mobile device may include one or more camera(s) 108 and a display 112

According to aspects of the present disclosure, when the mobile device 102 is in pedestrian navigation mode, one or more cameras 108 of the mobile device 102 may be configured to capture image frames for determining the misalignment angle 105. The image captured may be shown to a user in display 112.

FIG. 1B illustrates a side view of the mobile device 102 of FIG. 1A. In one approach, the mobile device 102 may be configured to use either front camera(s) 108a (located in the front side of the mobile device) or back camera(s) 108b (located in the back side of the mobile device) to capture image frames. For example, as shown in FIG. 1B, the front camera(s) 108a can be configured to capture the field of view of an area above the mobile device 102, and the back camera(s) 108b can be configured to capture the field of view of an area below the mobile device 102. In another approach, the mobile device 102 may be configured to use both the front camera(s) 108a and the back camera(s) 108b to capture image frames in both front view and back view of the mobile device 102. With this approach, in some venues, features on the floor or on the ceiling may be gathered to estimate the direction of motion of the mobile device 102 with respect to the mobile device orientation 103.

In yet another approach, both of the front camera(s) 108a and the back camera(s) 108b may be used in parallel. In this approach, errors caused by the two different perspectives in the front camera(s) 108a and the back camera(s) 108b may have opposite signs and may be compensated because perspectives of the front camera(s) 108a and the back camera(s) 108b are oriented 180 degrees apart from each other. In yet another approach, either camera may be chosen based on which field of view has more features which are easier to track and based on which field of view has fewer moving objects.

There are numerous criteria may be used in choosing the front camera(s) 108a over the back camera(s) 108b, or vice versa, including but not limited to: 1) which field of view gives more features; 2) which field of view are easier to track; and 3) which field of view has fewer moving objects. A camera may be chosen based on which one gives a higher average confidence metric for feature tracking. In addition, according to aspects of the present disclosure, the decision of which camera to track can be made adaptively since the environment of the mobile device 102 may change while it is being held by a user. In addition, according to aspects of the present disclosure, the mobile device 102 may be configured to use metrics to reject outliers since the image frames might contain features of moving parts. For example, one source of such moving parts may be the feet of the user. Another source of such moving parts may be the head of the user.

Figure 2B:
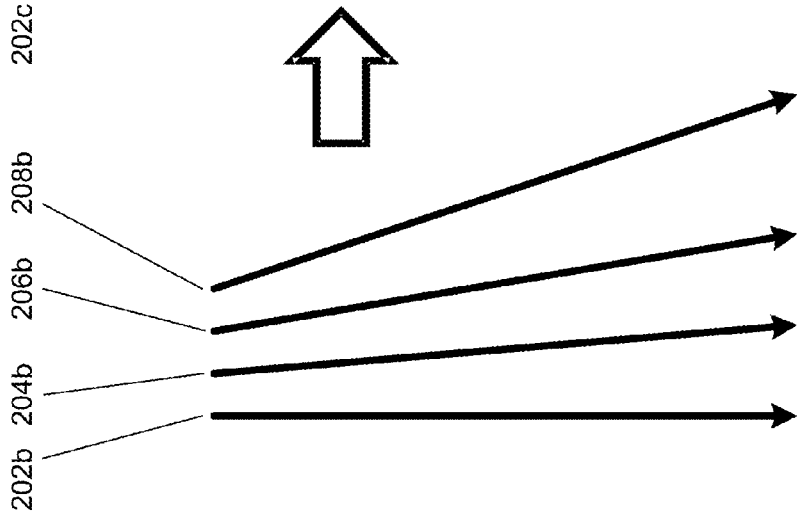
Figure 2A:
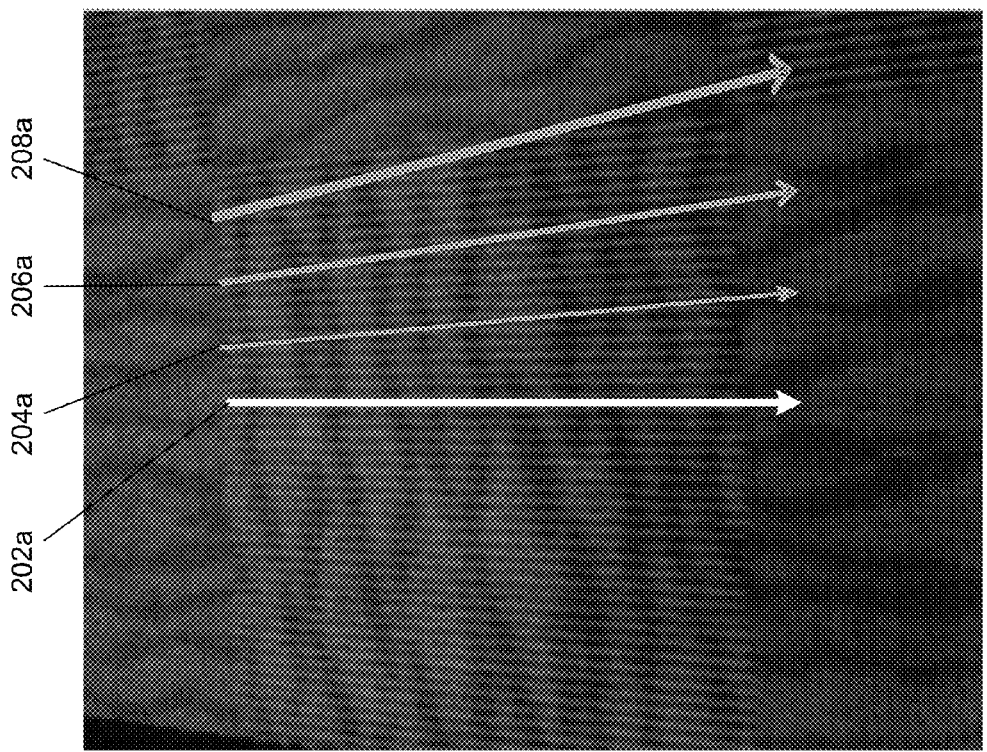

FIG. 2A-2C illustrate a method of performing perspective compensation for camera pitch and asymmetric distribution of features according to some aspects of the present disclosure. As shown in FIG. 2A, the arrows (202a, 204a, 206a and 208a) illustrate an asymmetric distribution of features due to a possible camera pitch in a pedestrian navigation application. Such asymmetric distribution of features may lead to incorrect estimation for direction of motion of the mobile device 102. FIG. 2B illustrates the same asymmetric distribution of features (represented by the arrows) due to camera pitch in a pedestrian navigation application without the image background. The corresponding arrows are shown as 202b, 204b, 206b and 208b. FIG. 2C illustrate perspective adjusted distribution of features, represented by the corresponding arrows 202c, 204c, 206c, and 208c.

To address the issues of asymmetric distribution of features, in one approach, the mobile device 102 may be configured to perform perspective correction based on angle of the mobile device to vertical as calculated using sensors, such as magnetometer, accelerometer, and gyroscope. In another approach, the mobile device 102 may be configured to use features near the center of an image frame in computing direction of motion of the mobile device 102. In yet another approach, a weighted average of features based on location, for example more weight for features near center may be employed in computing direction of motion of the mobile device 102. For example, features along the center of an image, represented by arrow 202a, may be assigned a weigh of 1 (100%), features represented by arrow 204a may be assigned a weight of 0.8 (80%), features represented by arrow 206a may be assigned a weight of 0.6 (60%), features represented by arrow 206a may be assigned a weight of 0.4 (40%), and so on.

According to aspects of the present disclosure, identifying and tracking features in image frames may be performed using a number of techniques. In one approach, a method of identifying features may be performed by examining the minimum eigenvalue of each 2 by 2 gradient matrix. Then the features are tracked using a Newton-Raphson method of minimizing the difference between the two windows. The method of multi-resolution tracking allows for relatively large displacements between images. Note that during tracking of features from one frame to the next frame, errors may accumulate. To detect potentially bad features, the mobile device 102 may be configured to monitor whether the image signal in the window around the feature in the current frame is still similar to the image signal around the feature in the previous frame. Since features may be tracked over many frames, the image content may be deformed. To address this issue, consistency check may be performed with a similarity or an affine mapping.

According to aspects of the present disclosure, to identify an object in an image, points on the object may be extracted to provide feature descriptions (also referred to as keypoints, feature points or features for short) of the object. This description, extracted from a training image, may then be used to identify the object when attempting to locate the object in a test image containing many other objects. To perform reliable recognition, the features extracted from the training image may be detectable even under changes in image scale, noise and illumination. Such points usually lie on high-contrast regions of the image, such as object edges.

Another characteristic of these features is that the relative positions between them in the original scene may not change from one image to another. For example, if only the four corners of a door are used as features, they may work regardless of the door's position; but if points in the frame are used, the recognition may fail if the door is opened or closed. Similarly, features located in articulated or flexible objects may typically not work if any change in their internal geometry happens between two images in the set being processed. In some implementations, SIFT detects and uses a larger number of features from the images, which can reduce the contribution of the errors caused by the local variations in the average error of all feature matching errors. Thus, the disclosed method may identify objects even among clutter and under partial occlusion; because the SIFT feature descriptor can be invariant to uniform scaling, orientation, and partially invariant to affine distortion and illumination changes.

For example, keypoints of an object may first be extracted from a set of reference images and stored in a database. An object is recognized in a new image by comparing each feature from the new image to this database and finding candidate matching features based on Euclidean distance of their feature vectors. From the full set of matches, subsets of keypoints that agree on the object and its location, scale, and orientation in the new image may be identified to filter out good matches. The determination of consistent clusters may be performed by using a hash table implementation of a generalized Hough transform. Each cluster of 3 or more features that agree on an object and its pose may then be subject to further detailed model verification and subsequently outliers may be discarded. The probability that a particular set of features indicates the presence of an object may then be computed based on the accuracy of fit and number of probable false matches. Object matches that pass the tests can be identified as correct with high confidence.

According to aspects of the present disclosure, image feature generation transforms an image into a large collection of feature vectors, each of which may be invariant to image translation, scaling, and rotation, as well as invariant to illumination changes and robust to local geometric distortion. These features share similar properties with neurons in inferior temporal cortex that are used for object recognition in primate vision. Key locations may be defined as maxima and minima of the result of difference of Gaussians function applied in scale space to a series of smoothed and resampled images. Low contrast candidate points and edge response points along an edge may be discarded. Dominant orientations are assigned to localized keypoints. This approach ensures that the keypoints are more stable for matching and recognition. SIFT descriptors robust to local affine distortion may then be obtained by considering pixels around a radius of the key location, blurring and resampling of local image orientation planes.

Features matching and indexing may include storing SIFT keys and identifying matching keys from the new image. In one approach, a modification of the k-d tree algorithm which is also referred to as the best-bin-first search method that may be used to identify the nearest neighbors with high probability using a limited amount of computation. The best-bin-first algorithm uses a modified search ordering for the k-d tree algorithm so that bins in feature space may be searched in the order of their closest distance from the query location. This search order requires the use of a heap-based priority queue for efficient determination of the search order. The best candidate match for each keypoint may be found by identifying its nearest neighbor in the database of keypoints from training images. The nearest neighbors can be defined as the keypoints with minimum Euclidean distance from the given descriptor vector. The probability that a match is correct can be determined by taking the ratio of distance from the closest neighbor to the distance of the second closest.

In one exemplary implementation, matches in which the distance ratio is greater than 0.8 may be rejected, which eliminates 90% of the false matches while discarding less than 5% of the correct matches. To further improve the efficiency of the best-bin-first algorithm, search may be cut off after checking a predetermined number (for example 100) nearest neighbor candidates. For a database of 100,000 keypoints, this may provide a speedup over exact nearest neighbor search by about 2 orders of magnitude, yet results in less than a 5% loss in the number of correct matches.

Note that with the exemplary implementation, the Hough Transform may be used to cluster reliable model hypotheses to search for keys that agree upon a particular model pose. Hough transform may be used to identify clusters of features with a consistent interpretation by using each feature to vote for object poses that may be consistent with the feature. When clusters of features are found to vote for the same pose of an object, the probability of the interpretation being correct may be higher than for any single feature. An entry in a hash table may be created to predict the model location, orientation, and scale from the match hypothesis. The hash table can be searched to identify clusters of at least 3 entries in a bin, and the bins may be sorted into decreasing order of size.

According to aspects of the present disclosure, each of the SIFT keypoints may specify 2D location, scale, and orientation. In addition, each matched keypoint in the database may have a record of its parameters relative to the training image in which it is found. The similarity transform implied by these 4 parameters may be an approximation to the 6 degree-of-freedom pose space for a 3D object and also does not account for any non-rigid deformations. Therefore, an exemplary implementation may use broad bin sizes of 30 degrees for orientation, a factor of 2 for scale, and 0.25 times the maximum projected training image dimension (using the predicted scale) for location. The SIFT key samples generated at the larger scale may be given twice the weight of those at the smaller scale. With this approach, the larger scale may in effect able to filter the most likely neighbors for checking at the smaller scale. This approach also improves recognition performance by giving more weight to the least-noisy scale. According to aspects of the present disclosure, to avoid the issue of boundary effects in bin assignment, each keypoint match may vote for the 2 closest bins in each dimension, giving a total of 16 entries for each hypothesis and further broadening the pose range.

Figure 3B:
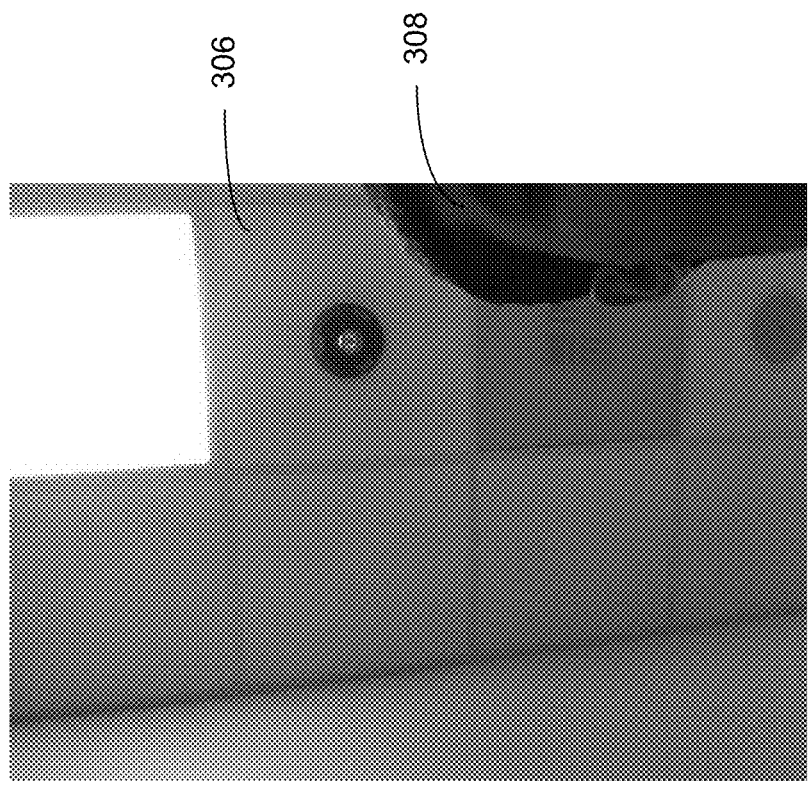
FIG. 3A and FIG. 3B illustrate a method of detecting and removing moving objects according to some aspects of the present disclosure.
Figure 3A:
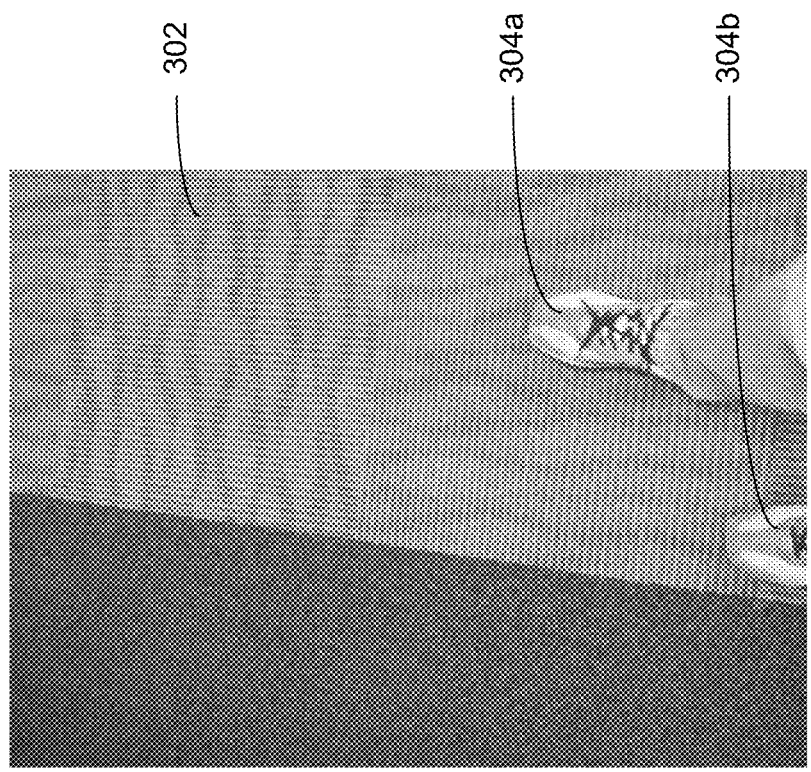

FIG. 3A and FIG. 3B illustrate a method of detecting and removing moving objects according to some aspects of the present disclosure. FIG. 3A illustrates an image frame 302 that includes user's feet 304a and 304b as moving objects. FIG. 3B illustrates another image frame 306 that includes user's face 308 as a moving object. The user's feet 304a and 304b and the user's face 308 may be considered as outliers; and features of such outliers may be removed from the image frames captures according to the methods described in the following sections.

According to aspects of the present disclosure, outliers may be removed by checking for agreement between each image feature and the model, for a given parameter solution. For example, given a linear least squares solution, each match may be required to agree within half the error range that is used for the parameters in the Hough transform bins. As outliers are discarded, the linear least squares solution may be resolved with the remaining points, and the process may be iterated. In some implementations, if less than a predetermined number of points (e.g. 3 points) remain after discarding outliers, the match may be rejected. In addition, a top-down matching phase may be used to add any further matches that agree with the projected model position, which may have been missed from the Hough transform bin due to the similarity transform approximation or other errors.

The decision to accept or reject a model hypothesis can be based on a detailed probabilistic model. The method first computes an expected number of false matches to the model pose, given the projected size of the model, the number of features within the region, and the accuracy of the fit. A Bayesian probability analysis can then give the probability that the object may be present based on the actual number of matching features found. A model may be accepted if the final probability for a correct interpretation is greater than a predetermined percentage (for example 95%).

According to aspects of the present disclosure, in one approach, rotation invariant feature transform (RIFT) method may be employed as a rotation-invariant generalization of SIFT to address under clutter or partial occlusion situations. The RIFT descriptor may be constructed using circular normalized patches divided into concentric rings of equal width and within each ring a gradient orientation histogram may be computed. To maintain rotation invariance, the orientation may be measured at each point relative to the direction pointing outward from the center.

In another approach, a generalized robust invariant feature (G-RIF) method may be used. The G-RIF encodes edge orientation, edge density and hue information in a unified form combining perceptual information with spatial encoding. The object recognition scheme uses neighboring context based voting to estimate object models.

In yet another approach, a speeded up robust feature (SURF) method may be used which uses a scale and rotation-invariant interest point detector/descriptor that can outperform previously proposed schemes with respect to repeatability, distinctiveness, and robustness. SURF relies on integral images for image convolutions to reduce computation time, and builds on the strengths of the leading existing detectors and descriptors (using a fast Hessian matrix-based measure for the detector and a distribution-based descriptor). The SURF method describes a distribution of Haar wavelet responses within the interest point neighborhood. Integral images may be used for speed, and 64 dimensions may be used to reduce the time for feature computation and matching. The indexing step may be based on the sign of the Laplacian, which increases the matching speed and the robustness of the descriptor.

In yet another approach, the principle component analysis SIFT (PCA-SIFT) method may be used. In some implementations, the PCA-SIFT descriptor is a vector of image gradients in x and y direction computed within the support region. The gradient region can be sampled at 39×39 locations. Thus, the vector can be of dimension 3042. The dimension can be reduced to 36 with PCA. In yet another approach, the Gradient location-orientation histogram (GLOH) method can be employed, which is an extension of the SIFT descriptor designed to increase its robustness and distinctiveness. In some implementations, the SIFT descriptor can be computed for a log-polar location grid with three bins in radial direction (the radius set to 6, 11, and 15) and 8 in angular direction, which results in 17 location bins. The central bin is not divided in angular directions. The gradient orientations may be quantized in 16 bins resulting in 272 bin histogram. The size of this descriptor can be reduced with PCA. The covariance matrix for PCA can be estimated on image patches collected from various images. The 128 largest eigenvectors may then be used for description.

In yet another approach, a two-object recognition algorithm may be employed to use with the limitations of current mobile devices. In contrast to the classic SIFT approach, the Features from Accelerated Segment Test (FAST) corner detector can be used for feature detection. This approach distinguishes between the off-line preparation phase where features may be created at different scale levels and the on-line phase where features may be created at a current fixed scale level of the mobile device's camera image. In one exemplary implementation, features may be created from a predetermined fixed patch size (for example 15×15 pixels) and form a SIFT descriptor with 36 dimensions. The approach can be further extended by integrating a Scalable Vocabulary Tree in the recognition pipeline. This allows an efficient recognition of a larger number of objects on mobile devices.

According to aspects of the present disclosure, the detection and description of local image features can help in object recognition. The SIFT features can be local and based on the appearance of the object at particular interest points, and may be invariant to image scale and rotation. They may also be robust to changes in illumination, noise, and minor changes in viewpoint. In addition to these properties, the features may be highly distinctive, relatively easy to extract and allow for correct object identification with low probability of mismatch. The features can be relatively easy to match against a (large) database of local features, and generally probabilistic algorithms such as k-dimensional (k–d) trees with best-bin-first search may be used. Object descriptions by a set of SIFT features may also be robust to partial occlusion. For example, as few as 3 SIFT features from an object may be sufficient to compute its location and pose. In some implementations, recognition may be performed in quasi real time, for small databases and on modern computer hardware.

According to aspects of the present disclosure, the random sample consensus (RANSAC) technique may be employed to remove outliers caused by moving objects in view of the camera. Note that the RANSAC uses an iterative method to estimate parameters of a mathematical model from a set of observed data which contains outliers. This method is a non-deterministic as it produces a reasonable result with an associated probability, where the probability may increase as more iteration is performed.

In one exemplary implementation, a set of observed data values, a parameterized model which can be fitted to the observations with corresponding confidence parameters. In this exemplary implementation, the method iteratively selects a random subset of the original data. These data can be hypothetical inliers and these hypothesis may then be tested as follows:
1. A model is fitted to the hypothetical inliers, i.e. all free parameters of the model are reconstructed from the inliers.
2. All other data are then tested against the fitted model and, if a point fits well to the estimated model; it is considered as a hypothetical inlier.
3. The estimated model can be considered acceptable if sufficiently number of points have been classified as hypothetical inliers.
4. The model is re-estimated from all hypothetical inliers, because it has only been estimated from the initial set of hypothetical inliers.
5. Finally, the model is evaluated by estimating the error of the inliers relative to the model.

The above procedure can be repeated for a predetermined number of times, each time producing either a model which may be rejected because too few points are classified as inliers or a refined model together with a corresponding error measure. In the latter case, the refined model is kept if the error is lower than the previously saved model.

In another exemplary implementation, moving objects in view of the camera can be actively identified and removed using a model based motion tracking method. In one approach, the objective of tracking can be treated as a problem of model recognition. A binary representation of the target can be tracked, and a Hausdorff distance based search is used to search regions of the image for the object. For a binary representation of the target (a model), output from the standard canny edge detector of the Gaussian smoothed image is augmented with the notion of a model history. At each frame, a Hausdorff search can be performed on each target, using the canny edges from the current image and the current model. In addition, an affine estimation may be performed to approximate the net background motion. From the results of these two searches, information can be gathered about the target, and be used to approximate the motion of the target, as well as separate the background from motion in the region of the target. To be able to handle hazard/unusual conditions (such as the object becoming occluded going into a shadow, the object leaving the frame, or camera image distortion providing bad image quality), history data about the target may be retained, such as the target's past motion and size change, characteristic views of the target (snapshots throughout time that provide an accurate representation of the different ways the target has been tracked), and match qualities in the past.

The history of tracking the target can be useful in more than just aiding hazard/unusual conditions; that part of a solid motion tracking method can involve history data, and not just a frame by frame method of motion comparison. This history state can provide information regarding how to decide what should be considered part of the target (e.g. things moving close to the object moving at the same speed should be incorporated into the object), and with information about motion and size, the method can predictively estimate where a lost object may have gone, or where it might reappear (which has been useful in recovering targets that leave the frame and reappear later in time).

An inherent challenge in the motion tracking method may be caused by the fact that the camera can have an arbitrary movement (as opposed to a stationary camera), which makes developing a tracking system that can handle unpredictable changes in camera motion difficult. A computationally efficient affine background estimation scheme may be used to provide information as to the motion of the camera and scene.

According to aspects of the present disclosure, an affine transformation for the image can be performed at time t to the image at time t+dt, which allows correlating the motion in the two images. This background information allows the method to synthesize an image at time t+dt from the image at time t and the affine transform that can be an approximation of the net scene motion. This synthesized image can be useful in generating new model information and removing background clutter from the model space, because a difference of the actual image at t+dt and the generated image at t+dt can be taken to remove image features from the space surrounding targets.

In addition to the use of the affine transform as a tool to clean-up the search space, it is also used to normalize the coordinate movement of the targets: by having a vector to track how the background may be moving, and a vector to track how the target may be moving, a difference of the two vector may be taken to generate a vector that describes the motion of the target with respect to the background. This vector allows the method to predictively match where the target should be, and anticipate hazard conditions (for example looking ahead in the direction of the motion can provide clues about upcoming obstacles, as well as keeping track of where the object may be in case of a hazard condition. When an object enters a hazard condition, the method may still be able to estimate the background motion, and use that coupled with the knowledge of the model's previous movements to guess where the model may reappear, or re-enter the frame.

The background estimation has been a key factor in the prolonged tracking of objects. Note that short term tracking may be performed without background estimation, but after a period of time, object distortion and hazards may be difficult to cope with effectively without a good estimation of the background.

According to aspects of the present disclosure, one of the advantages of using the Hausdorff distance as a matching operator is that it can be quite tolerant of changes in shape during matching, but using the Hausdorff distance as a matching operator may require the objects being tracked be more accurately defined.

In one approach, straight dilation-based methods of grabbing a new model from the time t+1 image can be used. Note that in some situations where there are non-object features close to the object (which occurs quite often), the dilation method may not be effective because it may slowly incorporate the entire scene into the model. Thus, a method of updating the model from frame to frame that can be tolerant to changes in the model shape, but not so relaxed that causing incorporating non-model pixels into the model may be adopted. One exemplary implementation is to use a combination of background removal and adding the previous models to the current model match window and taking what seems to be stable pixels, as well as the new ones surrounding them, which over time may either get eliminated from the model because they may not be stable, or get incorporated into the model. This approach has been effective in keeping the models relatively clean from clutter in the image. For example, with this approach, no longer does a road close to a truck get pulled into the model pixel by pixel. Note that the models may appear to be dilated, but this may be a result of the history effect of how the models are constructed, but it may also have the feature of making the search results more definite because this method can have more model pixels to possibly match in the next frame.

Note that at each frame, there may be a significant amount of computation to be performed. According to some implementations, the mobile device can be configured to perform smoothing/feature extraction, Hausdorff matching each target (for example one match per model), as well as affine background estimation. Each of these operations can be quite computationally expensive individually. In order to achieve real-time performance on a mobile device, the design can be configured to use as much parallelism as possible.

Figure 4:
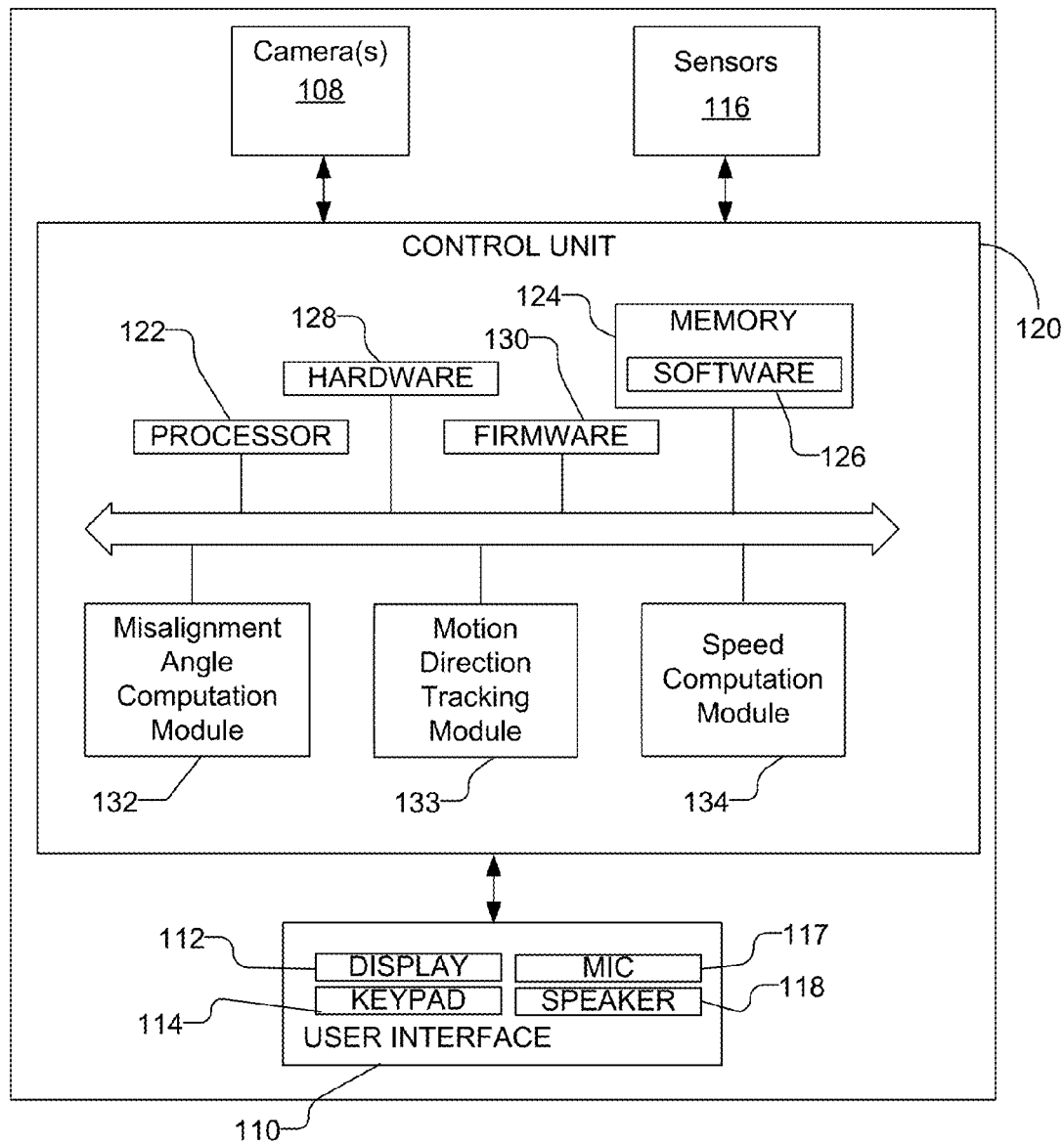
FIG. 4 illustrates a block diagram of an exemplary mobile device according to some aspects of the present disclosure.

FIG. 4 illustrates a block diagram of an exemplary mobile device according to some aspects of the present disclosure. The mobile device 102 includes camera(s) 108 for capturing images of the environment, which may be either individual photos or frames of video. The mobile device 102 may also include sensors 116, which may be used to provide data with which the mobile device 102 can determine its position and orientation, i.e., pose. Examples of sensors that may be used with the mobile device 102 include accelerometers, quartz sensors, gyros, micro-electromechanical system (MEMS) sensors used as linear accelerometers, as well as magnetometers.

The mobile device 102 may also include a user interface 110 that includes display 112 capable of displaying images. The user interface 110 may also include a keypad 114 or other input device through which the user can input information into the mobile device 102. If desired, the keypad 114 may be obviated by integrating a virtual keypad into the display 112 with a touch sensor. The user interface 110 may also include a microphone 117 and one or more speakers 118, for example, if the mobile device is a cellular telephone. Of course, mobile device 102 may include other components unrelated to the present disclosure.

The mobile device 102 further includes a control unit 120 that is connected to and communicates with the camera(s) 108 and sensors 116, as well as the user interface 110, along with any other desired features. The control unit 120 may be provided by one or more processors 122 and associated memory/storage 124. The control unit 120 may also include software 126, as well as hardware 128, and firmware 130. The control unit 120 includes a misalignment angle computation module 132 configured to the misalignment angle between the orientation and the direction of motion of the mobile device 102. The control unit further includes motion direction tracking module 133 configured to track the direction of motion of the mobile device 102 (which may indicate the direction of motion of the user). The control unit 120 further includes speed computation module 134 configured to compute the speed of the mobile device 102 (which may indicate the speed of the user). The misalignment angle computation module 132, the motion direction tracking module 133, and the speed computation module 134 are illustrated separately from processor 122 and/or hardware 128 for clarity, but may be combined and/or implemented in the processor 122 and/or hardware 128 based on instructions in the software 126 and the firmware 130.

Figure 5A:
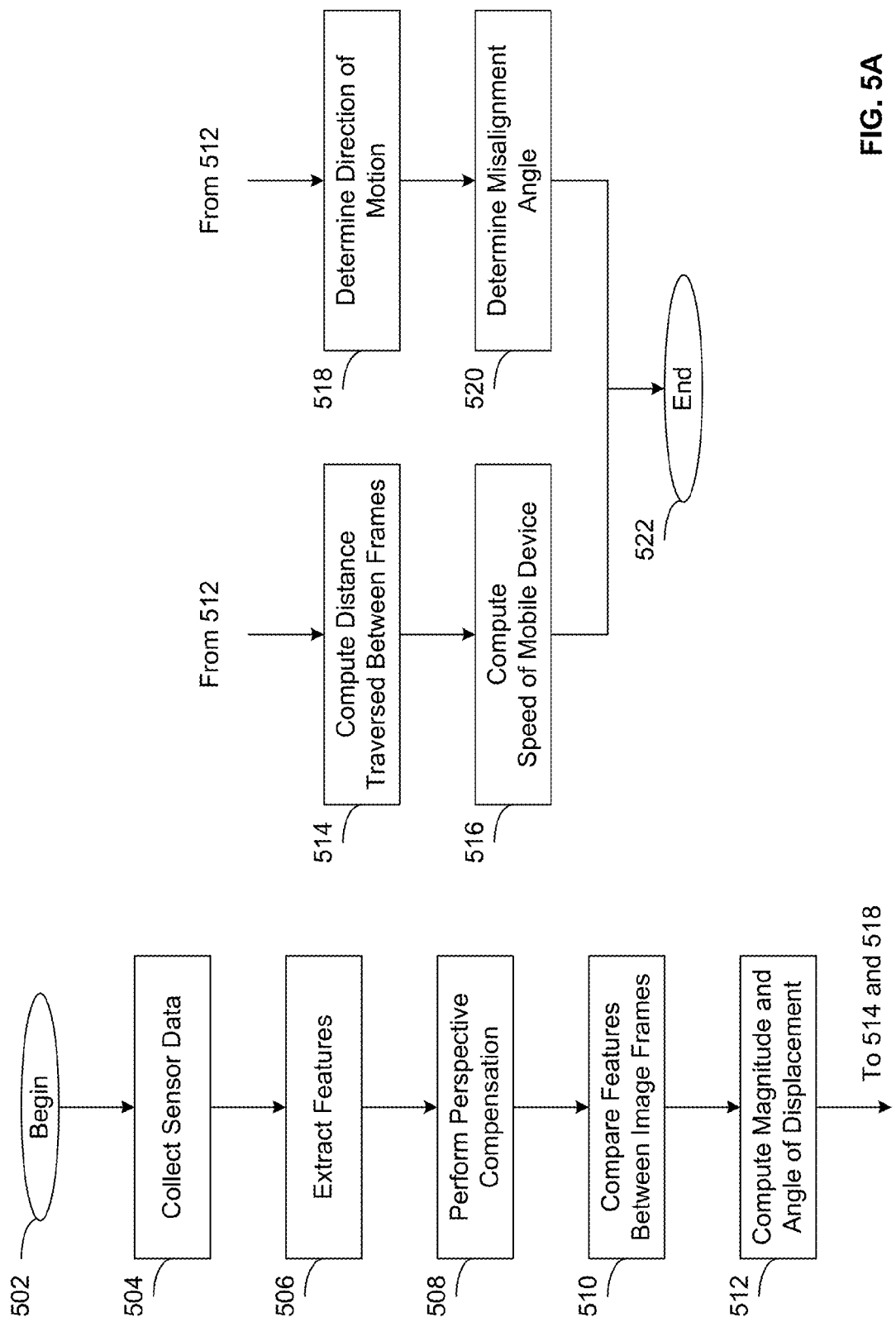
FIG. 5A illustrates a method of estimating speed and misalignment angle of a mobile device according to some aspects of the present disclosure.

FIG. 5A illustrates a method of estimating speed and misalignment angle of a mobile device according to some aspects of the present disclosure. In the example shown in FIG. 5A, the method starts in block 502, and thereafter moves to block 504 where the method collects sensor data. According to aspects of the present disclosure, the sensor data may include image frames captured by one or more cameras 108a and 108b as described in FIG. 1B. The sensor data may also include data collected by accelerometer, gyroscope, magnetometer, and/or by a wireless receiver of the mobile device 102. In block 506, the method extracts features from image frames captured. In block 508, the method performs perspective compensation. According to aspects of the present disclosure, examples of performing perspective compensation are provided in association with the descriptions of FIG. 2A-FIG. 2C. In block 510, the method compares features between two consecutive image frames to determine separations in pixels between the two consecutive image frames. According to aspects of the present disclosure, methods of extracting and comparing features in image frames are provided in association with the descriptions of FIG. 2A-FIG. 2C. In block 512, the method computes magnitude and angle of displacement based at least in part on the comparison of features between image frames performed in block 510.

In block 514, the method computes distance traversed between image frames. In block 516, the method computes speed of the mobile device according to the methods described in association with FIG. 5B. In block 518, the method determines direction of motion of the mobile device based at least in part on the angle of displacement determined in block 512. In block 520, the method determines misalignment angle between the orientation and direction of motion of the mobile device based at least in part on the direction of motion determined in block 518 and the orientation determined by data obtained by one or more sensors of the mobile device 102. The method ends in block 520.

Figure 5B:
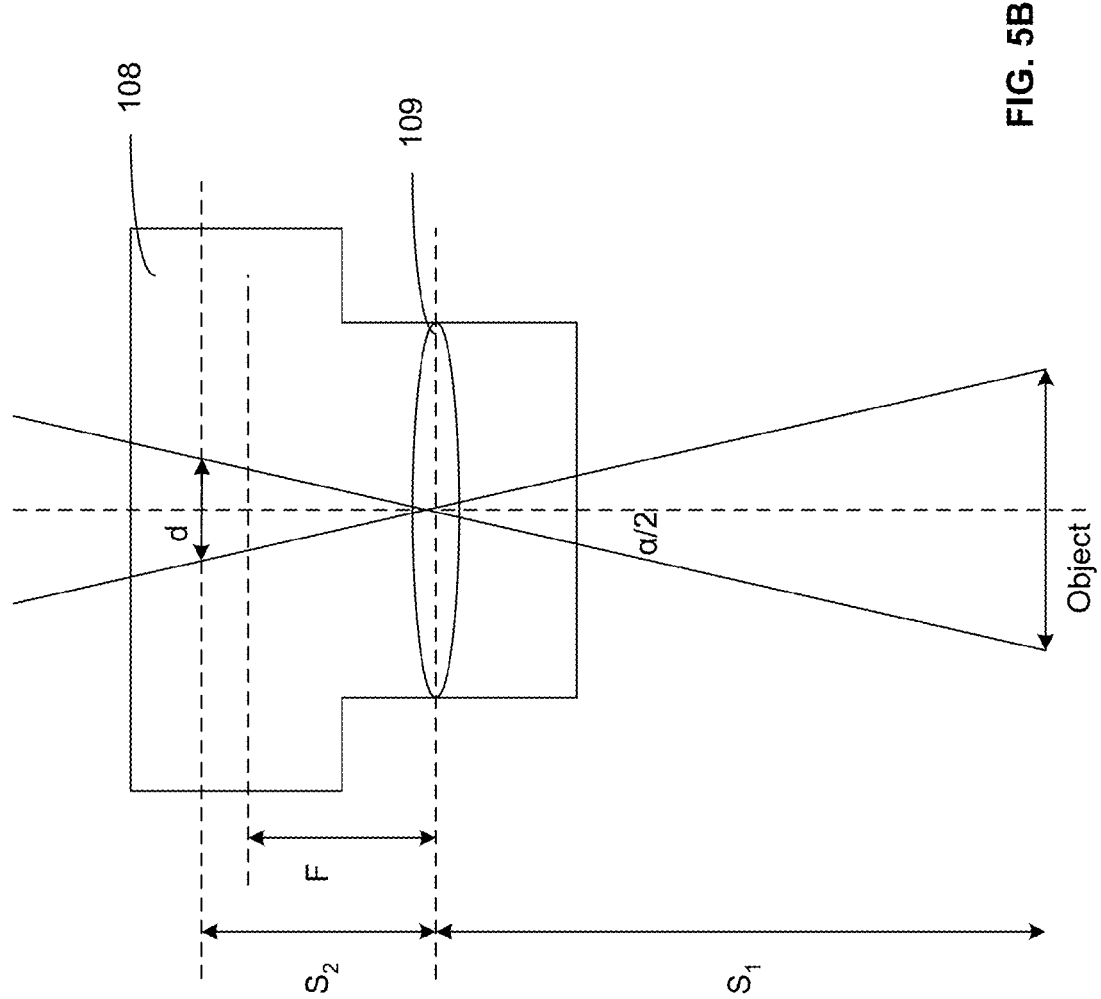
FIG. 5B illustrates a method of estimating speed of a mobile device according to some aspects of the present disclosure.

FIG. 5B illustrates a method of estimating speed of a mobile device according to some aspects of the present disclosure. In the exemplary implementation shown in FIG. 5B, by tracking features in image frames captured by the one or more cameras 108a and/or 108b of the mobile device 102, the separation in pixels between two consecutive image frames can be determined. The method converts a displacement in pixel in the image frames to a displacement of distance in meters. Then, the method determines the field of view of one or more cameras (108a and/or 108b) and the height of the one or more cameras being held above the ground. Note that due to perspective projection, the same distance can correspond to different number pixels in the image frames captured, depending on how far away an object may be from the perspective of camera of the mobile device. In some applications, a default height of the mobile device 102 being held above the ground may be estimated. In some other applications, the height may be determined from the GPS location or from other positioning estimates (such as WiFi, Bluetooth measurements) of the mobile device 102.

As shown in FIG. 5B, for a lens 109 of a camera 108 projecting a rectilinear image, the angle of view Alpha ($\alpha$) can be calculated from the chosen dimension (d), and effective focal length (F) as Alpha=2*arctan(d/2F), where d represents the size of the sensor in the direction measured. Note that the object image may occupy entire sensor if object angular size as seen from camera equals camera angle of view, with such physical object size being d*S1/S2.

Denoting number of pixels in the d dimension as MaxPix (that can be, for example 720 or 1080 if images are obtained in Video mode, one pixel of image can correspond to d*S1/S2/MaxPix meters of the object (surface). If camera (in user hand) is traversing a stationary object and object features have moved by N pixels, it means that the camera has moved by Npix*d*S1/S2/MaxPix. If the movement has occurred over time interval T (like 1/30 second between two adjoining 30 Hz frames) then the speed of the mobile device can be estimated as Speed=Npix*d*S$_1$/S$_2$/MaxPix/T.

The above formula can be also presented in the alternative form without reference to the sensor size and distance from sensor to lens. Since in the exemplary implementation, S1 represents distance of the camera from the floor H, and S1 is approximately equal F, the expression can be re-written as Speed=Npix*d*H/F/MaxPix/T. In addition, Alpha=2*arctan (d/2F) can be approximated as Alpha=d/F, which yields formula Speed=Alpha/MaxPix*Npix*H/T.

In this formula Alpha/MaxPix includes a combination of known camera parameters, object image displacement Npix and travel time T can be measured, and distance of the camera from the floor H can be either assumed or calibrated when the user speed can be known, for example from GNSS or WiFi location.

Figure 6:
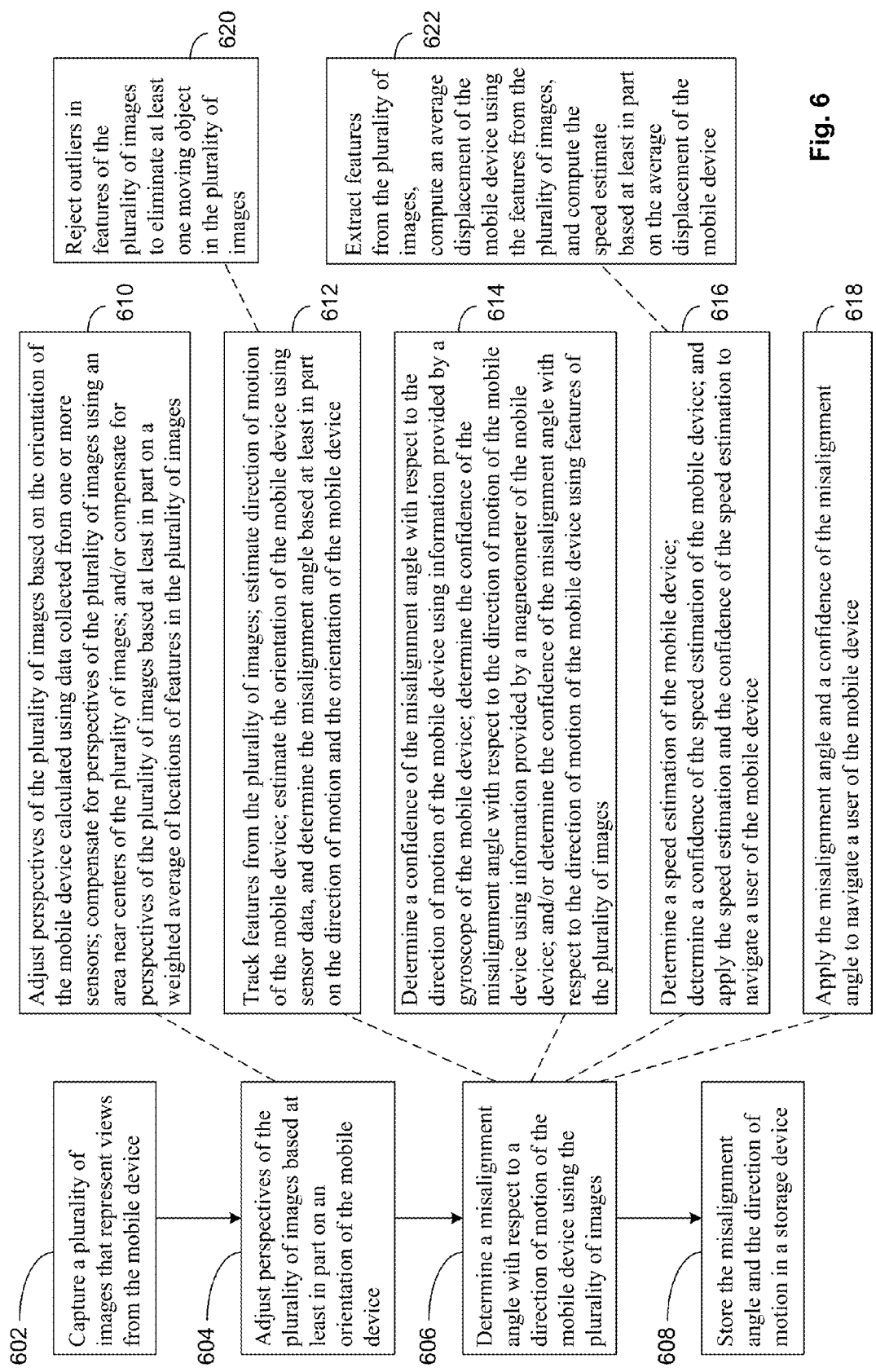
FIG. 6 illustrates an exemplary method of determining position characteristics of a mobile device according to some aspects of the present disclosure.

FIG. 6 illustrates an exemplary method of determining position characteristics of a mobile device according to some aspects of the present disclosure. In block 602, the control unit 120 can be configured to capture a plurality of images that represent views from the mobile device. In block 604, the control unit 120 can be configured to adjust perspectives of the plurality of images based at least in part on an orientation of the mobile device. In block 606, the control unit 120 can be configured to determine a misalignment angle with respect to a direction of motion of the mobile device using the plurality of images. In block 608, the control unit 120 can be configured to store the misalignment angle and the direction of motion in a storage device.

According to embodiments of the present disclosure, the methods performed in block 604 may further include methods performed in block 610. In block 610, the control unit 120 can be configured to adjust perspectives of the plurality of images based on the orientation of the mobile device calculated using data collected from one or more sensors, compensate for perspectives of the plurality of images using an area near centers of the plurality of images, and/or compensate for perspectives of the plurality of images based at least in part on a weighted average of locations of features in the plurality of images.

According to embodiments of the present disclosure, the methods performed in block 606 may further include methods performed in blocks 612 to 622. In block 612, the control unit 120 can be configured to track features from the plurality of images, estimate direction of motion of the mobile device, estimate the orientation of the mobile device using sensor data, and determine the misalignment angle based at least in part on the direction of motion and the orientation of the mobile device.

In block 614, the control unit 120 can be configured to perform at least one of: determine a confidence of the misalignment angle with respect to the direction of motion of the mobile device using information provided by a gyroscope of the mobile device, determine the confidence of the misalignment angle with respect to the direction of motion of the mobile device using information provided by a magnetometer of the mobile device, and determine the confidence of the misalignment angle with respect to the direction of motion of the mobile device using features of the plurality of images.

In block 616, the control unit 120 can be configured to determine a speed estimation of the mobile device, determine a confidence of the speed estimation of the mobile device, and apply the speed estimation and the confidence of the speed estimation to navigate a user of the mobile device. In block 618, the control unit 120 can be configured to apply the misalignment angle and a confidence of the misalignment angle to navigate a user of the mobile device.

According to embodiments of the present disclosure, the methods performed in block 612 may further include methods performed in block 620. In block 620, the control unit 120 can be configured to reject outliers in features of the plurality of images to eliminate at least one moving object in the plurality of images.

According to embodiments of the present disclosure, the methods performed in block 616 may further include methods performed in block 622. In block 622, the control unit 120 can be configured to extract features from the plurality of images, compute an average displacement of the mobile device using the features from the plurality of images, and compute the speed estimate based at least in part on the average displacement of the mobile device.

In block 622, the control unit 120 can be further configured to compare the features from the plurality of images, determine a separation of pixels between two consecutive images in the plurality of images, determine a time interval between the two consecutive images, and calculate the speed estimate of the mobile device in accordance with the separation of pixels and the time interval between the two consecutive images. In addition, the control unit 120 can be further configured to calibrate a height of the mobile device according to at least one of GPS location information and WIFI location information of the mobile device.

According to some aspects of the present disclosure, the functions described in FIG. 5A and FIG. 6 may be implemented by the control unit 120 of FIG. 4, potentially in combination with one or more other elements. In some implementations, the functions may be performed by processor 122, software 126, hardware 128, and firmware 130 or a combination of the above to perform various functions of the apparatus described in the present disclosure. In yet some other implementations, the functions described in FIG. 5A and FIG. 6 may be implemented by the processor 122 in combination with one or more other elements, for example elements 108-118 and 124-134 of FIG. 4.

Figure 7A:
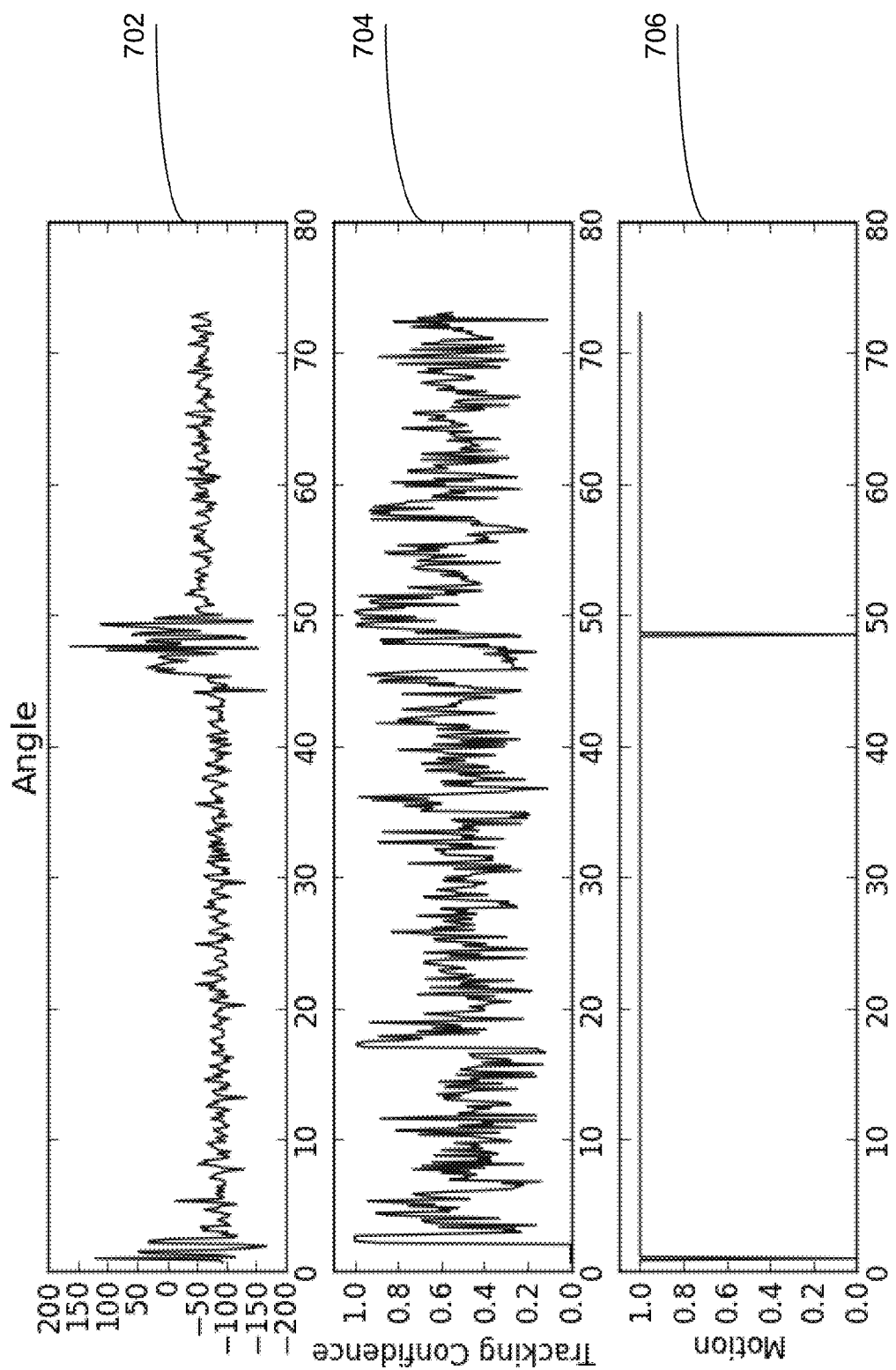
FIG. 7A illustrates a method of monitoring motion, misalignment angle and confidence associated with the misalignment angle for a mobile device over a period of time according to some aspects of the present disclosure.

FIG. 7A illustrates a method of monitoring motion, misalignment angle and confidence associated with the misalignment angle for a mobile device over a period of time according to some aspects of the present disclosure. As shown in FIG. 7A, a first graph 702 shows the misalignment angle (also referred to as angle in FIG. 7A) between the orientation and the direction of motion of the mobile device 102 over a period of time, which is 80 seconds in this example. A second graph 704 shows the corresponding confidence value associated with the misalignment angle over the same period of time. A third graph 706 shows whether the mobile device 102 is in motion over the same period of time.

In some applications, the confidence estimate can be an input to a navigation algorithm which can be configured to tell whether the mobile device may rely on the misalignment angle determined at a point in time. As shown above, the confidence estimate may be derived from the feature tracking algorithm. In some applications, the confidence value can also be estimated by the gyroscope and magnetometer. For example, the gyroscope and magnetometer may be configured to indicate the confidence value of the misalignment angle may be reduced when the user is turning (i.e. changing direction of motion).

In some other applications, when the gyroscope value exceeds a threshold, it can be inferred that the user may be either moving the mobile device or turning; and in these cases, the confidence value may be reduced accordingly. When the gyroscope indicates a turn, the filter that computes averages of the misalignment angle may be reset. Note that the confidence metric illustrates how well features are being tracked. If the confidence value is low, the mobile device may be configured to use the angle from a previous time or from a different camera, such as switching from the front-facing camera to the back-facing camera or vice versa.

Figure 7B:
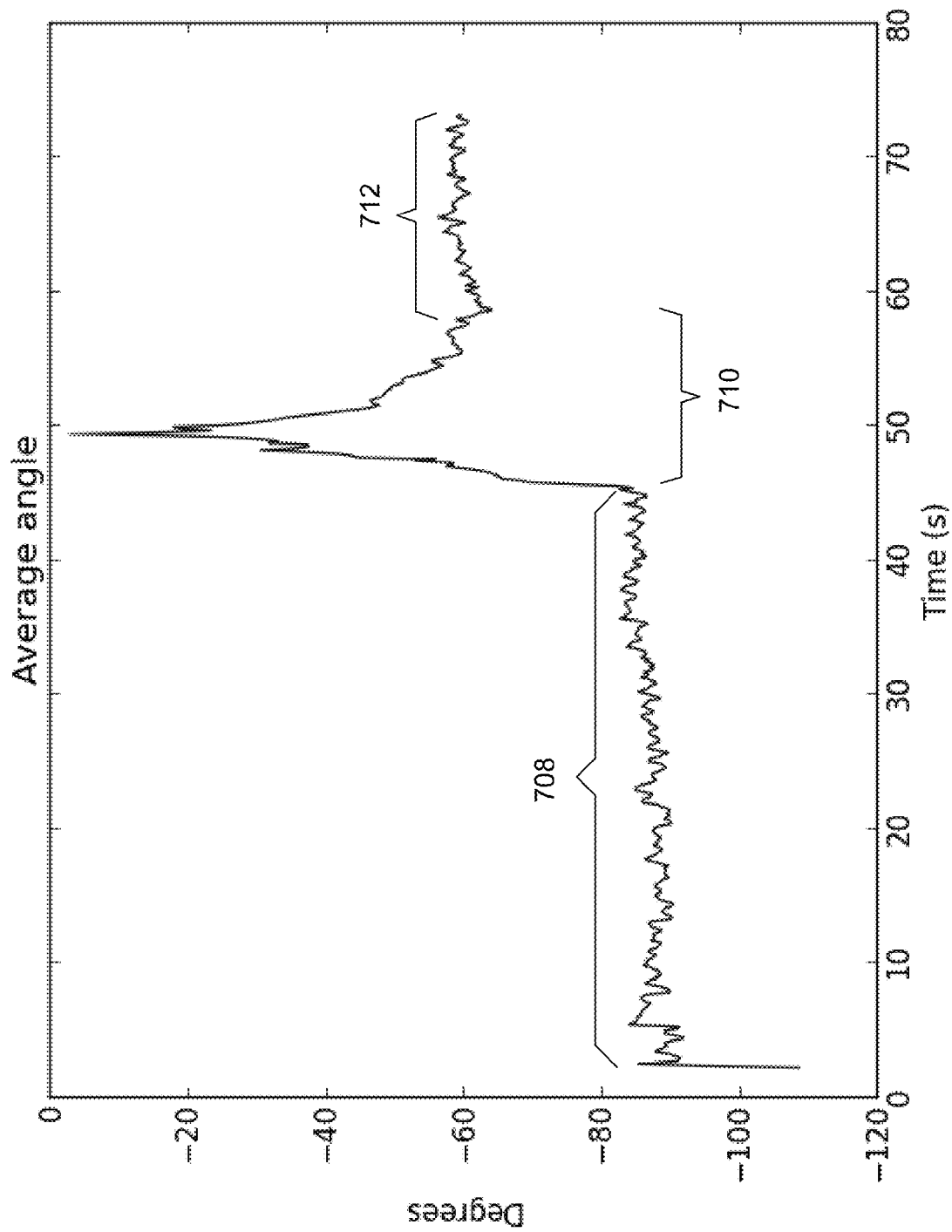
FIG. 7B illustrates a graph showing changes to an average misalignment angle of a mobile device over a period of time according to some aspects of the present disclosure.

FIG. 7B illustrates a graph showing changes to an average misalignment angle of a mobile device over a period of time according to some aspects of the present disclosure. As shown in FIG. 7B, in a first period 708 from approximately 2 to 46 seconds, the average misalignment angle (also referred to as average angle in FIG. 7B) is approximately –86 degrees. In a second period 710 from approximately 47 to 60 seconds, the average misalignment angle changes sharply, which typically indicates the user may be moving the mobile device to a different position or the user may be turning. In a third period 712 from approximately 61 to 75 seconds, the average misalignment angle is approximately –60 degrees. Such information may be used to assist positioning and pedestrian navigation applications.

According to aspects of the present disclosure, the method of monitoring misalignment angle and direction of motion can be alternatively or additionally performed as follows. In some implementations, for a sensor-aided pedestrian navigation application running on the mobile device 102, the misalignment angle computation module 132 may be utilized to determine the angular offset between the orientation of the mobile device 102 and the direction of forward motion of the mobile device 102, as given by the motion direction tracking module 133. For example, as shown in FIG. 1A, the misalignment angle can be defined by the angular difference between the direction of motion M of a mobile device 102 and the direction of orientation O of the mobile device. By calculating and utilizing the misalignment angle, the direction of motion M of the mobile device 102 can be obtained in cases in which conventional motion direction techniques fail. More particularly, the misalignment angle can have a wide range of value (e.g., from 0 to 360 degrees) depending on the direction of orientation O of the mobile device 102. Without the misalignment angle even approximate conversion of device heading to motion direction can be challenging.

The misalignment angle is utilized to facilitate positioning of the mobile device 102. For example, a mobile device 102 can be equipped with a compass or other mechanisms to provide information indicating the heading of the mobile device 102, which can be defined as the direction at which the mobile device is oriented (e.g., in relation to magnetic north) within a given precision or tolerance amount. However, unless the mobile device 102 is immovably positioned such that it is always oriented in the direction of motion, the compass heading of the mobile device 102 alone does not represent the direction in which the mobile device 102 is moved. Thus, the misalignment angle can be utilized to convert the direction of orientation of the mobile device 102 to the direction of motion in the event that the mobile device 102 is not oriented in the direction of motion. As an example, the direction of motion in a compass-aided dead reckoning application can be computed as the compass heading plus the misalignment angle.

The motion direction tracking module 133 and the misalignment angle computation module 132 can operate based on sensor data, information obtained from a step detector (not shown), etc., to determine the misalignment angle associated with movement of a mobile device 102 being carried by a pedestrian. Initially, based on data collected from accelerometer(s) and/or the step detector, pedestrian steps can be identified and the direction of gravity relative to the sensor axes of the mobile device 102 can be determined. These initial computations form a basis for the operation of the motion direction tracking module 133 and the misalignment angle computation module 132, as described below.

With regard to pedestrian motion, such as walking, running, etc., the direction of motion changes within a given pedestrian step and between consecutive steps based on the biomechanics of pedestrian motion. For example, rather than proceeding in a constant forward direction, a moving pedestrian shifts left to right (e.g., left during a step with the left foot and right during a step with the right foot) with successive steps and vertically (e.g., up and down) within each step. Accordingly, transverse (lateral) acceleration associated with a series of pedestrian steps cycles between left and right with a two-step period while forward and vertical acceleration cycle with a one-step period.

According to aspects of the present disclosure, the motion direction tracking module 133 may include a step shifter, a step summation module and a step correlation module (not shown in FIG. 4). The motion direction tracking module 133 can leverage the above properties of pedestrian motion to isolate the forward component of motion from the vertical and transverse components. For example, the motion direction tracking module 133 records acceleration information obtained from accelerometer(s) 28 (e.g., in a buffer) over consecutive steps. To rectify forward acceleration and suppress or cancel the transverse component of the acceleration, the motion direction tracking module 133 utilizes the step shifter and the step summation module to sum odd and even steps. In other words, the step shifter shifts acceleration data corresponding to a series of pedestrian steps in time by one step. Subsequently, the step summation module sums the original acceleration information with the shifted acceleration information. As noted above, transverse changes sign with consecutive steps with a two-step period due to body rotation and rolling while forward and vertical acceleration exhibit a one-step period. As a result, summing pedestrian steps after a one-step shift reduces transverse acceleration while having minimal impact on vertical or forward acceleration.

If the mobile device 102 is not centrally positioned on a pedestrian's body or shifts orientation during the pedestrian motion, transverse acceleration may not be symmetrical from step to step. Accordingly, while the step shifter and step summation module operate to reduce the transverse component of acceleration, these modules may not substantially eliminate the transverse acceleration. To enhance the removal of transverse acceleration, the step correlation module can further operate on the acceleration data obtained from the accelerometer(s).

As a pedestrian steps forward (e.g., when walking), the center of gravity of the pedestrian moves up at the beginning of the step and down at the end of the step. Similarly, the forward speed of the pedestrian decreases when the foot of the pedestrian reaches the ground at the end of a step and increases during the step. This relationship between forward and vertical motion during the progression of a pedestrian step may be leveraged by the step correlation module in further canceling transverse acceleration. In particular, if the acceleration associated with a pedestrian step is viewed as a periodic function, it can be observed that the vertical acceleration and forward acceleration associated with the step are offset by approximately a quarter of a step (e.g., 90 degrees). Accordingly, the step correlation module correlates vertical acceleration with horizontal acceleration shifted (by the step shifter) by one quarter step both forwards and backwards (e.g., +/−90 degrees).

After shifting and correlation as described above, the vertical/forward correlation may be comparatively strong due to the biomechanics of pedestrian motion, while the vertical/transverse correlation may be approximately zero. Thus, the correlations between vertical and horizontal acceleration shifted forward and backward by one quarter step are computed, and the forward shifted result may be subtracted from the backward shifted result (since the results of the two correlations are opposite in sign) to further reduce the transverse component of acceleration.

After the motion direction tracking module 133 substantially cancels transverse acceleration as discussed above, the misalignment angle computation module 132 determines the angle between the forward component of acceleration and the orientation of the mobile device 102. According to aspects of the present disclosure, the misalignment angle computation module 132 may include an Eigen analysis module and an angle direction inference module (not shown in FIG. 4). In one exemplary implementation, the misalignment angle computation module 132 identifies the misalignment angle via Eigen analysis, as performed by an Eigen analysis module, and further processing performed by an angle direction inference module. Based on information provided by the motion direction tracking module 133, the Eigen analysis module determines the orientation of the sensor axes of the mobile device with respect to the earth, from which a line corresponding to the direction of motion of the mobile device 102 is obtained. The angle direction inference module analyzes the obtained line, as well as forward and vertical acceleration data corresponding to the corresponding pedestrian step(s), to determine the direction of the misalignment angle based on the direction of motion of the mobile device 102 (e.g., forward or backward along the obtained line). By doing so, the angle direction inference module operates to resolve forward/backward ambiguity associated with the misalignment angle.

According to aspects of the present disclosure, the angle direction inference module leverages the motion signature of a pedestrian step to determine the direction of the misalignment angle. As discussed above, forward and vertical acceleration corresponding to a pedestrian step are related due to the mechanics of leg rotation, body movement, and other factors associated with pedestrian motion. Thus, the angle direction inference module can be configured to utilize knowledge of these relationships to identify whether a motion direction is forward or backward along a given line.

While the above discussion relates to obtaining a two-dimensional motion direction, e.g., with respect to a horizontal plane, similar techniques may be utilized to obtain a direction of motion in three dimensions. Thus, the techniques described herein can be extended to account for changes in altitude, pedestrian motion along an uneven surface, and/or other factors impacting the direction of motion in three dimensions.

Additionally, the techniques described above can be extended to leverage a gyroscope in addition to accelerometer(s). With further reference to the biomechanics of pedestrian motion, leg rotation and other associated movements during a pedestrian step can be classified as angular movements, e.g., measured in terms of pitch or roll. Accordingly, a gyroscope can be used to separate gravity from acceleration due to movement such that the reference frame for computation can be rotated to account for the orientation of the mobile device 102 prior to the calculations described above.

Note that at least the following three paragraphs, FIG. 4, FIG. 5A, FIG. 5B, FIG. 6 and their corresponding descriptions provide means for capturing a plurality of images that represent views from the mobile device, means for adjusting perspectives of the plurality of images based at least in part on an orientation of the mobile device, means for determining a misalignment angle with respect to a direction of motion of the mobile device using the plurality of images, and means for storing the misalignment angle and the direction of motion in a storage device. At least the following three paragraphs, FIG. 1A, FIG. 1B, FIG. 4, FIG. 5A, FIG. 5B, FIG. 6 and their corresponding descriptions provide means for adjusting perspectives of the plurality of images based on the orientation of the mobile device calculated using data collected from one or more sensors; means for compensating for perspectives of the plurality of images using an area near centers of the plurality of images; means for compensating for perspectives of the plurality of images based at least in part on a weighted average of locations of features in the plurality of images; means for tracking features from the plurality of images; means for estimating direction of motion of the mobile device; means for estimating the orientation of the mobile device using sensor data; means for determining the misalignment angle based at least in part on the direction of motion and the orientation of the mobile device; means for determining a confidence of the misalignment angle with respect to the direction of motion of the mobile device using information provided by a gyroscope of the mobile device; means for determining the confidence of the misalignment angle with respect to the direction of motion of the mobile device using information provided by a magnetometer of the mobile device; means for determining the confidence of the misalignment angle with respect to the direction of motion of the mobile device using features of the plurality of images; means for determining a speed estimation of the mobile device; means for determining a confidence of the speed estimation of the mobile device; and means for applying the speed estimation and the confidence of the speed estimation to navigate a user of the mobile device.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media and/or other non-transitory media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:
1. A method of determining position characteristics of a mobile device, comprising:
    capturing a plurality of images that represent views from the mobile device;
    tracking features in the plurality of images;

adjusting asymmetric distortion of the features in the plurality of images based at least in part on an orientation of the mobile device, wherein adjusting asymmetric distortion of the features in the plurality of images comprises compensating for asymmetric distortion of the features in the plurality of images using an area based on centers of the plurality of images;

determining a misalignment angle with respect to a direction of motion of the mobile device using the adjusted plurality of images; and storing the misalignment angle and the direction of motion in a storage device.

2. The method of claim 1, wherein adjusting asymmetric distortion of the features in the plurality of images further comprises:

compensating for asymmetric distortion of the features in the plurality of images based at least in part on a weighted average of locations of features in the plurality of images, wherein features around the centers of the plurality of images are given more weights and features away from the centers of the plurality of images are given less weights.

3. The method of claim 1, wherein determining the misalignment angle comprises:

estimating direction of motion of the mobile device;

estimating the orientation of the mobile device using sensor data; and determining the misalignment angle based at least in part on the direction of motion and the orientation of the mobile device.

4. The method of claim 3, wherein the tracking features from the plurality of images comprises:

rejecting outliers in features of the plurality of images to eliminate at least one moving object in the plurality of images.

5. The method of claim 1, further comprising at least one of:

determining a confidence of the misalignment angle with respect to the direction of motion of the mobile device using information provided by a gyroscope of the mobile device;

determining the confidence of the misalignment angle with respect to the direction of motion of the mobile device using information provided by a magnetometer of the mobile device;

determining the confidence of the misalignment angle with respect to the direction of motion of the mobile device using features of the plurality of images;

or some combination thereof.

6. The method of claim 1 further comprises:

determining a speed estimation of the mobile device;

determining a confidence of the speed estimation of the mobile device; and applying the speed estimation and the confidence of the speed estimation to navigate a user of the mobile device.

7. The method of claim 6, wherein determining a speed estimate comprises:

extracting features from the plurality of images;

computing an average displacement of the mobile device using the features from the plurality of images; and computing the speed estimate based at least in part on the average displacement of the mobile device.

8. The method of claim 7, wherein computing the speed estimate comprises:

comparing the features from the plurality of images;

determining a separation of pixels between two consecutive images in the plurality of images;

determining a time interval between the two consecutive images; and calculating the speed estimate of the mobile device in accordance with the separation of pixels and the time interval between the two consecutive images.

9. The method of claim 8 further comprises:

calibrating a height of the mobile device according to at least one of GNSS location information and WIFI location information of the mobile device.

10. The method of claim 1 further comprises:

applying the misalignment angle and a confidence of the misalignment angle to navigate a user of the mobile device.

11. An apparatus, comprising:

a control unit including processing logic, the processing logic comprising:

logic configured to capture a plurality of images that represent views from a mobile device;

logic configured to track features in the plurality of images;

logic configured to adjust asymmetric distortion of the features in the plurality of images based at least in part on an orientation of the mobile device, wherein adjusting asymmetric distortion of the features in the plurality of images comprises compensating for asymmetric distortion of the features in the plurality of images using an area based on centers of the plurality of images;

logic configured to determine a misalignment angle with respect to a direction of motion of the mobile device using the adjusted plurality of images; and logic configured to store the misalignment angle and the direction of motion in a storage device.

12. The apparatus of claim 11, wherein the logic configured to adjust asymmetric distortion of the features in the plurality of images further comprises:

logic configured to compensate for asymmetric distortion of the features in the plurality of images based at least in part on a weighted average of locations of features in the plurality of images, wherein features around the centers of the plurality of images are given more weights and features away from the centers of the plurality of images are given less weights.

13. The apparatus of claim 11, wherein the logic configured to determine the misalignment angle comprises:

logic configured to estimate direction of motion of the mobile device;

logic configured to estimate the orientation of the mobile device using sensor data; and logic configured to determine the misalignment angle based at least in part on the direction of motion and the orientation of the mobile device.

14. The apparatus of claim 13, wherein the logic configured to track features from the plurality of images comprises:

logic configured to reject outliers in features of the plurality of images to eliminate at least one moving object in the plurality of images.

15. The apparatus of claim 11, further comprising at least one of:

logic configured to determine a confidence of the misalignment angle with respect to the direction of motion of the mobile device using information provided by a gyroscope of the mobile device;

logic configured to determine the confidence of the misalignment angle with respect to the direction of motion of the mobile device using information provided by a magnetometer of the mobile device;

logic configured to determine the confidence of the misalignment angle with respect to the direction of motion of the mobile device using features of the plurality of images;
or some combination thereof.

16. The apparatus of claim 11 further comprises:
logic configured to determine a speed estimation of the mobile device;
logic configured to determine a confidence of the speed estimation of the mobile device; and
logic configured to apply the speed estimation and the confidence of the speed estimation to navigate a user of the mobile device.

17. The apparatus of claim 16, wherein the logic configured to determine a speed estimate comprises:
logic configured to extract features from the plurality of images;
logic configured to compute an average displacement of the mobile device using the features from the plurality of images; and
logic configured to compute the speed estimate based at least in part on the average displacement of the mobile device.

18. The apparatus of claim 17, wherein the logic configured to compute the speed estimate comprises:
logic configured to compare the features from the plurality of images;
logic configured to determine a separation of pixels between two consecutive images in the plurality of images;
logic configured to determine a time interval between the two consecutive images; and
logic configured to calculate the speed estimate of the mobile device in accordance with the separation of pixels and the time interval between the two consecutive images.

19. The apparatus of claim 18 further comprises:
logic configured to calibrate a height of the mobile device according to at least one of GNSS location information and WIFI location information of the mobile device.

20. The apparatus of claim 11 further comprises:
logic configured to apply the misalignment angle and a confidence of the misalignment angle to navigate a user of the mobile device.

21. A computer program product comprising non-transitory medium storing instructions for execution by one or more computer systems, the instructions comprising:
instructions for capturing a plurality of images that represent views from a mobile device;
instructions for tracking features in the plurality of images;
instructions for adjusting asymmetric distortion of the features in the plurality of images based at least in part on an orientation of the mobile device, wherein adjusting asymmetric distortion of the features in the plurality of images comprises compensating for asymmetric distortion of the features in the plurality of images using an area based on centers of the plurality of images;
instructions for determining a misalignment angle with respect to a direction of motion of the mobile device using the adjusted plurality of images; and
instructions for storing the misalignment angle and the direction of motion in a storage device.

22. The computer program product of claim 21, wherein the instructions for adjusting asymmetric distortion of the features in the plurality of images further comprises:
instructions for compensating for asymmetric distortion of the features in the plurality of images based at least in part on a weighted average of locations of features in the plurality of images, wherein features around the centers of the plurality of images are given more weights and features away from the centers of the plurality of images are given less weights.

23. The computer program product of claim 21, wherein the instructions for determining the misalignment angle comprises:
instructions for estimating direction of motion of the mobile device;
instructions for estimating the orientation of the mobile device using sensor data; and
instructions for determining the misalignment angle based at least in part on the direction of motion and the orientation of the mobile device.

24. The computer program product of claim 23, wherein the instructions for tracking features from the plurality of images comprises:
instructions for rejecting outliers in features of the plurality of images to eliminate at least one moving object in the plurality of images.

25. The computer program product of claim 21, further comprising at least one of:
instructions for determining a confidence of the misalignment angle with respect to the direction of motion of the mobile device using information provided by a gyroscope of the mobile device;
instructions for determining the confidence of the misalignment angle with respect to the direction of motion of the mobile device using information provided by a magnetometer of the mobile device;
instructions for determining the confidence of the misalignment angle with respect to the direction of motion of the mobile device using features of the plurality of images;
or some combination thereof.

26. The computer program product of claim 21 further comprises:
instructions for determining a speed estimation of the mobile device;
instructions for determining a confidence of the speed estimation of the mobile device; and
instructions for applying the speed estimation and the confidence of the speed estimation to navigate a user of the mobile device.

27. The computer program product of claim 26, wherein the instructions for determining a speed estimate comprises:
instructions for extracting features from the plurality of images;
instructions for computing an average displacement of the mobile device using the features from the plurality of images; and
instructions for computing the speed estimate based at least in part on the average displacement of the mobile device.

28. The computer program product of claim 27, wherein the instructions for computing the speed estimate comprises:
instructions for comparing the features from the plurality of images;
instructions for determining a separation of pixels between two consecutive images in the plurality of images;
instructions for determining a time interval between the two consecutive images; and
instructions for calculating the speed estimate of the mobile device in accordance with the separation of pixels and the time interval between the two consecutive images.

29. The computer program product of claim 28 further comprises:

instructions for calibrating a height of the mobile device according to at least one of GNSS location information and WIFI location information of the mobile device.

30. The computer program product of claim 21 further comprises:

instructions for applying the misalignment angle and a confidence of the misalignment angle to navigate a user of the mobile device.

31. A system, comprising:

means for capturing a plurality of images that represent views from a mobile device;

means for tracking features in the plurality of images;

means for adjusting asymmetric distortion of the features in the plurality of images based at least in part on an orientation of the mobile device, wherein adjusting asymmetric distortion of the features in the plurality of images comprises compensating for asymmetric distortion of the features in the plurality of images using an area based on centers of the plurality of images;

means for determining a misalignment angle with respect to a direction of motion of the mobile device using the adjusted plurality of images; and means for storing the misalignment angle and the direction of motion in a storage device.

32. The system of claim 31, wherein the means for adjusting asymmetric distortion of the features in the plurality of images further comprises:

means for compensating for asymmetric distortion of the features in the plurality of images based at least in part on a weighted average of locations of features in the plurality of images, wherein features around the centers of the plurality of images are given more weights and features away from the centers of the plurality of images are given less weights.

33. The system of claim 31, wherein the means for determining the misalignment angle comprises:

means for estimating direction of motion of the mobile device;

means for estimating the orientation of the mobile device using sensor data; and means for determining the misalignment angle based at least in part on the direction of motion and the orientation of the mobile device.

34. The system of claim 31, further comprising at least one of:

means for determining a confidence of the misalignment angle with respect to the direction of motion of the mobile device using information provided by a gyroscope of the mobile device;

means for determining the confidence of the misalignment angle with respect to the direction of motion of the mobile device using information provided by a magnetometer of the mobile device;

means for determining the confidence of the misalignment angle with respect to the direction of motion of the mobile device using features of the plurality of images; or some combination thereof.

35. The system of claim 31 further comprises:

means for determining a speed estimation of the mobile device;

means for determining a confidence of the speed estimation of the mobile device; and means for applying the speed estimation and the confidence of the speed estimation to navigate a user of the mobile device.

* * * * *